United States Patent
Paschek et al.

(10) Patent No.: US 8,157,318 B2
(45) Date of Patent: Apr. 17, 2012

(54) INSTALLATION SUPPORT OF A LOADING FLOOR OF A PASSENGER CAR

(75) Inventors: Joachim Paschek, Illingen (DE); Claus Baumgart, Ingersheim (DE); Jan Fischer, Bietigheim-Bissingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 113 days.

(21) Appl. No.: 12/363,999

(22) Filed: Feb. 2, 2009

(65) Prior Publication Data
US 2009/0195029 A1    Aug. 6, 2009

(30) Foreign Application Priority Data
Feb. 2, 2008   (DE) .................. 10 2008 007 300

(51) Int. Cl.
*B62D 25/20* (2006.01)

(52) U.S. Cl. ............... 296/193.07; 296/37.8; 296/37.16; 296/191

(58) Field of Classification Search .............. 296/24.4, 296/26.1, 26.11, 197.07, 193.01, 37.6, 37.1, 296/37.16, 100.01, 191; 224/42.32; 410/8, 410/104, 105, 106, 115, 116
See application file for complete search history.

(56) References Cited

U.S. PATENT DOCUMENTS

| | | | |
|---|---|---|---|
| 5,441,183 A * | 8/1995 | Frenzel | 224/542 |
| 6,811,196 B2 * | 11/2004 | Gammon | 296/37.1 |
| 6,899,366 B2 * | 5/2005 | Krueger et al. | 296/37.8 |
| 6,921,119 B2 * | 7/2005 | Haspel et al. | 296/24.4 |
| 7,261,504 B2 | 8/2007 | Haspel | |
| 2003/0184107 A1 | 10/2003 | Hapspel et al. | |
| 2004/0135390 A1 | 7/2004 | Gammon | |
| 2005/0088005 A1 | 4/2005 | Krueger et al. | |
| 2007/0041804 A1 | 2/2007 | Stoeckl et al. | |
| 2009/0074547 A1 * | 3/2009 | Klotz et al. | 414/392 |

FOREIGN PATENT DOCUMENTS

| | | | |
|---|---|---|---|
| DE | EP0667260 | * | 8/1995 |
| DE | 10047542 A1 | | 1/2002 |
| DE | 102004001367 A1 | | 8/2005 |
| DE | 10321890 B4 | | 10/2005 |

* cited by examiner

*Primary Examiner* — Glenn Dayoan
*Assistant Examiner* — Pinel Romain

(57) ABSTRACT

An installation support of a loading floor of a passenger car is distinguished in that it is a component which is different from the bodyshell of the passenger car and is provided in order to define fitting positions of side wall panels and of the loading floor relative to one another. Furthermore, a welded assemblage of a passenger car body has at least one rear longitudinal member. The welded assemblage is provided in order to be screwed to such an installation support by a screw connection. The screw connection has cage nuts which are provided for the screw connection and are guided moveably in the longitudinal member transversely with respect to the longitudinal direction of the longitudinal member.

12 Claims, 1 Drawing Sheet

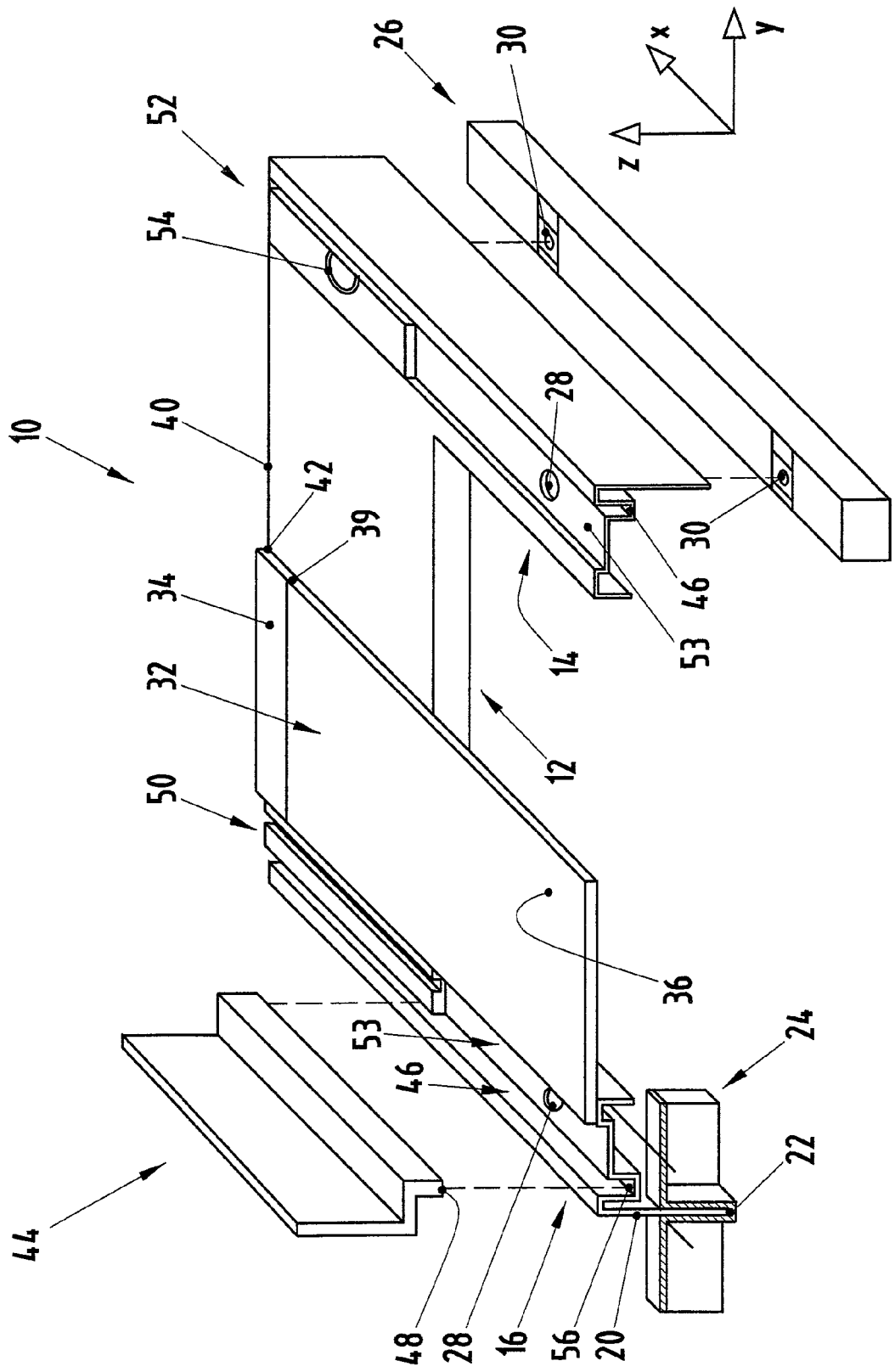

INSTALLATION SUPPORT OF A LOADING FLOOR OF A PASSENGER CAR

CROSS-REFERENCE TO RELATED APPLICATION

This application claims the priority, under 35 U.S.C. §119, of German application DE 10 2008 007 300.8, filed Feb. 2, 2008; the prior application is herewith incorporated by reference in its entirety.

BACKGROUND OF THE INVENTION

Field of the Invention

The invention relates to an installation support of a loading floor of a passenger car. The invention furthermore relates to a welded assemblage of a passenger car body, the welded assemblage having at least one rear longitudinal member.

In this case, a loading floor is understood as meaning a component which forms a generally flat base surface for a loading space or trunk, i.e. for a region within the body, which region is provided for receiving luggage and/or other items and which is delimited by the loading floor from uneven body structures located therebelow.

The loading space is usually located in the rear of a motor vehicle and, in addition to being downwardly bounded by the loading floor, is bounded to the sides by side wall panels, to the front by one or more seat backs and to the rear by a tailgate.

In the case of known loading floors, the body itself serves as an installation support for the loading floor. For example, the latter can rest on flat parts of lower longitudinal members and can be fastened there.

When the tailgate is open, the impression of quality is determined substantially by the position, parallelism and width of visible gaps between the boundaries of the loading space.

When the tailgate is open, the eye of the observer eye is drawn in particular to joints, which run in the longitudinal direction of the vehicle, between the side wall panels and the loading floor and/or between structures, such as rails and the side wall panels, which run in the longitudinal direction of the vehicle. In order to keep visible tolerances within an inconspicuous order of magnitude, the involved parts have to be aligned in a complicated manner with respect to one another during assembly.

SUMMARY OF THE INVENTION

It is accordingly an object of the invention to provide an installation support of a loading floor of a passenger car which overcomes the above-mentioned disadvantages of the prior art devices of this general type, which permits installation with a reduced outlay and/or with which reduced positional tolerances of the involved components can be obtained such that, as a rule, an improved impression of quality is produced. A further object of the invention is to specify a welded assemblage which is provided for receiving and fixing such an installation support.

With the foregoing and other objects in view there is provided, in accordance with the invention, an installation support for a loading floor of a passenger car. The installation support contains a component being different from a bodyshell of the passenger car and defines fitting positions of side wall panels of the passenger car and of the loading floor relative to one another.

Owing to the fact that the installation support according to the invention is a component which is different from the bodyshell of the passenger car and is provided in order to define fitting positions of the side wall panels and of the loading floor relative to one another, the tolerances of the fitting positions are substantially defined by the manufacturing tolerances of the installation support.

The tolerances belong to the group of tool-associated tolerances. Tool-associated tolerances are produced, for example, during the manufacturing of individual body parts, such as side walls, longitudinal members, etc., due to tolerances of the pressing tools and/or forging tools and/or casting tools and of the processed material.

What are referred to as bodyshell-defined tolerances are to be distinguished from the tool-associated tolerances. Bodyshell-defined tolerances are produced during the joining together of the individual body parts and of the welded assemblages, which are composed of individual body parts, to form the finished bodyshell.

As a rule, the load-bearing structures under the loading floor and behind the side wall panels belong to different welded assemblages. As a result, when the different welded assemblages are joined together to form the vehicle bodyshells, comparatively large tolerances are produced.

Since the side wall panels were hitherto screwed to structures on the side walls or were connected to plastic plug-in connectors while the loading floor was connected to other structures, for example to the longitudinal members, the positions of the components relative to one another were affected by bodyshell-defined tolerances.

Therefore, in the prior art, comparatively large positional tolerances are produced between the side wall panels and the loading floor and/or, if holders for luggage securing elements are arranged in the loading floor, between the side wall panels and the holders, the compensation of which positional tolerances requires the abovementioned high outlay.

In the case of the invention, the outlay is no longer necessary at all, since the relative positions of side wall panels to the loading floor and vice versa are defined by the installation supports, which are only affected by tool tolerances, and are independent of the positional tolerances of the bodyshell.

In the case of the invention, the sole connection which is affected by bodyshell-defined tolerances arises between the installation support as a whole and the bodyshell. Tolerances of the connection are compensated for by the moveable guidance of the cage nuts. In a first step, the invention permits the installation support, loading floor and side wall panels to be connected in a still comparatively loose manner. Only after the pre-assembly thereof is the resulting, preassembled assembly as a whole aligned in the vehicle. Tolerances with respect to the bodyshell are therefore compensated for via the cage nuts.

If luggage securing elements, such as rails or securing eyes, are additionally integrated in the loading floor, the same advantages are also produced with regard to the positions of the rails or eyes in a correspondingly configured installation support.

In a preferred refinement, the installation support has a front region and side regions, with it extending in the front region transversely between rear wheel houses of the passenger car, and with the side regions extending parallel to a longitudinal axis of the passenger car. This refinement permits a comparatively extensive absorption of forces acting in the Z direction (i.e. parallel to the vertical axis of the vehicle) and makes it possible for elongate structures, such as rails, to be readily guided within the side regions. In this case, a central region between the side regions is not covered by the installation support, and therefore regions located therebelow, for example a spare wheel trough, are accessible when the loading floor is raised.

It is also preferred that the installation support is provided in order to be secured to the vehicle body in a predetermined position in the transverse direction of the vehicle relative to a reference point of the vehicle body. In a preferred configuration, a receptacle in a lock crossmember covering is provided as the reference point. By this configurations, the installation support is centered in the center of the vehicle, as a result of which the fitting positions of the loading floor, of the side wall panels and of the luggage securing elements, which may be present, are then also aligned relative to the center of the vehicle with minimal tolerances. The resultant symmetry contributes to a further improvement in the impression of quality.

In one configuration, the installation support is a single part. In an alternative configuration, it has at least one separate left part and one separate right part which, in the installed state, butt against each other and which, by their own dimensions, define the distance between the outer boundaries of the installation support. The advantages already mentioned are produced in both alternatives. The configuration with the divided installation support has the additional advantage that distortion of the body is absorbed by rotation of both parts of the installation support, the rotation taking place in the contact surface of the parts. Noises which could otherwise be produced by distortion of the installation support are avoided as a result.

It is also preferred that the holders for the luggage securing elements are defined by first grooves, which run in the longitudinal direction, in the installation support. This results in the luggage securing elements being guided and secured in the installation support in a manner capable of bearing a load. The same applies analogously to a further configuration, in which the holding devices for the side wall panels are defined by second grooves, which run in the longitudinal direction, in the installation support. The guidance of the side wall panels in grooves result in that the panels merely have to be plugged in place during installation, which facilitates the installation and saves on fastening material, such as screws. Furthermore, the grooves permit a modular construction and therefore the provision of different loading floor variants through the use of different luggage securing elements, such as rails and securing eyes, in conjunction with identical installation supports.

In a preferred configuration, the second grooves run within the first grooves and are lower than the first grooves. By the second grooves being accommodated within the first grooves, the luggage securing elements can be arranged closer to the side wall panels than if the grooves were to run separately from one another. A separate contact surface for the side wall panels is provided by the second grooves being inserted lower. In addition, the lower insertion permits a movement of a projection, which engages in the groove, of a side wall panel in the Z direction, which is helpful for the alignment and for a secure support.

It is also preferred that the installation support is provided in order to be connected to the bodyshell by screws which also serve to fasten the luggage securing elements to the installation support. The common fastening results in that only comparatively few screws are required and that the installation is simplified and shortened.

It goes without saying that the features mentioned above and those which have yet to be explained below can be used not only in the respectively stated combination, but also in different combinations or on their own without departing from the scope of the present invention.

Other features which are considered as characteristic for the invention are set forth in the appended claims.

Although the invention is illustrated and described herein as embodied in an installation support of a loading floor of a passenger car, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a diagrammatic, perspective view of an installation support together with further components of a loading space of a passenger car according to the invention.

DETAILED DESCRIPTION OF THE INVENTION

Referring now to the single FIGURE of the drawing in detail, therein is shown an installation support 10 together with further components (partially illustrated) of a loading space of a passenger car. The installation support 10 is a component which is different from the bodyshell and is provided, by its shape and structure, in order to define fitting positions of side wall panels and of a loading floor relative to one another.

This is also explained in more detail further below.

First, however, the arrangement and installation of the installation support 10 in the vehicle are discussed. In a fitted state, a front region 12, with respect to the vehicle, of the installation support 10 extends transversely between rear wheel houses of the passenger car. In addition to the transversely running, front region 12, the installation support 10 also has side regions 14, 16 which extend parallel to the longitudinal axis of the passenger car. In this case, the longitudinal direction lies parallel to the x axis in the FIGURE while the transverse axis lies parallel to the y axis and the vertical axis lies parallel to the z axis in the FIGURE.

The installation support 10 is provided in order to be secured in the transverse direction y of the vehicle in a predetermined position relative to a reference point of the vehicle body. In the configuration which is illustrated in the FIGURE, the securing takes place by a limb 20 of the profile of the side region 16 being secured in a receptacle 22 of a lock crossmember covering 24. When the bodyshell is joined together, the lock crossmember has to be particularly precisely positioned with respect to other welded assemblages, such as longitudinal members and side walls, in order to obtain uniform gap sizes between the body and the tailgate. The position of the receptacle 22 is therefore coupled to the center of the vehicle in the y direction by a tool-associated tolerance and therefore constitutes a suitable reference point for the alignment of the installation support in the y direction. In a preferred configuration, the other side region 14 is also secured in the lock crossmember covering 24. It goes without saying that the securing by the profile and the receptacle 22 merely constitutes one possible configuration of a securing in the y direction and that such a securing can also be implemented with other mutually complementary structures, such as bolts or pins and receptacles matched thereto in a form-fitting manner.

The lock crossmember covering 24, the side regions 14 and 16 and the front region 12 of the installation support 10 therefore bound an opening through which a clearance remaining under the fitted installation support 10, for example a spare wheel trough, remains accessible.

The securing serves to center the installation support 10 in the vehicle and does not have to be configured in order to transmit greater retaining forces. In the configuration illustrated in the FIGURE, such greater retaining forces are absorbed and/or transmitted by screw connections between the installation support 10 and longitudinal members 26 of the vehicle bodyshell. In the FIGURE, the screw connection takes place by non-illustrated screws being inserted through holes 28 of the installation support 10 and being screwed into screw nuts 30 which are guided moveably in the y direction in the longitudinal member 26. By the moveable guidance, bodyshell tolerances occurring between the longitudinal member 26 and the lock crossmember are compensated for, and therefore tightening of the screws in the connection of the installation support 10 to the longitudinal member 26 does not have an adverse effect on the alignment of the installation support 10 relative to the reference point defined by the lock crossmember.

The longitudinal member 26 constitutes part of a welded assemblage of a body of a passenger car, wherein the welded assemblage is provided in order to be screwed to the installation support 10 by a screw connection, and has cage nuts 30 which are provided for the screw connection and are guided moveably in the longitudinal member 26 transversely with respect to the longitudinal direction x of the longitudinal member 26.

The structure of the installation support 10, the structure serving to define the fitting positions of the side wall panels and of the loading floor relative to one another, is explained below. A loading floor 32 has a fixed part 34 and a moveable part 36 which are connected to each other by a hinge 39. For reasons of clarity, only half of a loading floor is illustrated in the FIGURE. The moveable part 36 can be raised in order to permit access to the loading space volume remaining under the fitted installation support 10. The loading floor 32 in particular has a board made of wood, plastic, light metal or a composite material, which board is capable of load bearing in the z direction, and is customarily covered with a carpet. In such a configuration, the hinge 39 is preferably realized as a carpet hinge.

The fixed part 34 is connected fixedly to the installation support 10, with the fastening in one configuration taking place by fastening elements, such as bolts, which are located in the x direction in the font side of the installation support 10 and are therefore covered in the FIGURE by the installation support 10.

The fastening elements are preferably configured in such a manner that they define the seat of the loading floor 32, in the fitted state, relative to the installation support 10. As an alternative or in addition, the fixed part 34 of the loading floor has guide structures, such as projections, holes or grooves, which engage in a form-fitting manner in complementary guide structures of the installation support 10. In a simple configuration, an edge 40 of the installation support 10 together with a complementary channel 42 in that surface of the fixed part 34 which faces the installation support 10 serves as the guide structure. The essential feature is not the precise configuration of the guide structures but rather that the latter define the position of the loading floor 32 relative to the installation support 10 with tool-associated dimensional tolerances.

The same applies analogously to guide structures which define the position of a side wall panel 44 relative to the installation support 10. The FIGURE shows a configuration of the installation support 10 which has grooves 46 which are provided by their dimensions in order to receive complementary guide structures, such as projections or ends 48 of the side wall panel 44.

The guide structures 46 for the side wall panels 44 and the guide structures 40 for the loading floor are therefore defined by a corresponding structure of the installation support 10 according to the invention. Their relative position with respect to one another and therefore also the relative position of the side wall panels 44 and of the loading floor 32 is independent of bodyshell tolerances and depends only on tool-associated tolerances. These are essentially tool-associated tolerances which occur during the manufacturing of the installation support 10.

The installation support 10 illustrated in the FIGURE furthermore has holders for luggage securing elements. In one configuration, rails 50 are used as the luggage securing elements. This configuration is illustrated in the left half of the FIGURE. The right half of the FIGURE shows a configuration in which insert strips 52 with securing eyes 54 are used as luggage securing elements. The rails 50 and the insert strips 52 are held by first grooves 53 which extend in the side regions 14, 16 in the longitudinal direction x of the installation support 10.

In a preferred configuration, the second grooves 46 run within the first grooves 53 and are lower than the first grooves 53. By the second grooves 46 being accommodated within the first grooves 53, the luggage securing elements can be arranged closer to the side wall panels 44 than if the grooves 46, 53 were to run separately from each other. By the second grooves 46 being inserted lower, a separate contact surface 56 for the side wall panels 44 is provided at the depth of the second grooves 46. In addition, the lower insertion permits a movement of the projection (end) 48, which engages in the groove 46, of the side wall panel 44 in the z direction, which is helpful for the alignment and for secure support of the side wall panel 44.

It is also preferred that the installation support 10 is provided in order to be connected to the bodyshell by screws which also serve to fasten any luggage securing elements which are present to the installation support. During the installation in the vehicle, the installation support is inserted into the vehicle. In this case, the loading floor 32 can already be pre-assembled and therefore connected to the installation support 10. Subsequently, the side walls 44 are plugged into the second grooves 46, rails 50 which are possibly present or the installation strips 52 are inserted into the first grooves 53, and the installation support 10 is secured at the reference point of the bodyshell. If the rails 50 or the insertion strips 52 are present, shanks of the abovementioned screws are first of all inserted through correspondingly provided screw receptacles in the rails 50 or insertion strips 52 and holes 28 in the installation support 10 and screwed loosely into the cage nuts guided moveably in the longitudinal member 26.

The side walls 44 and the loading floor 32 and possibly present rails 50 and insertion strips 52 therefore form a loading floor assembly which is still connected comparatively loosely to the bodyshell. If the installation support 10 in this state is rotated about its reference point, the side walls 44 can still be displaced slightly within the grooves 46, but such a displacement can only occur along the grooves 46. That is to say, in particular, that the gap sizes between side walls 44 and loading floor 32 and/or rails 50 or insertion strips 52 no longer change. They are already fixed by the guides in the correspondingly structured installation support 10.

During the installation in the vehicle, the entire loading floor assembly containing the installation support 10, the side walls 44, the loading floor 32 and the rails 50 or the insertion strips 52 can therefore be aligned in a simple manner without changing the gap sizes. The simplified alignment considerably shortens the time necessary for the installation. In the aligned state, the abovementioned screws are subsequently tightened such that the entire loading floor assembly is connected fixedly to the bodyshell.

The common fastening results in that only comparatively few screws are required, which additionally simplifies and shortens the installation.

The installation support 10 is preferably produced from plastic. A suitable manufacturing method is injection molding. In one configuration, the installation support is a single part. In an alternative configuration, it has at least one separate left part and one separate right part which, in the installed state, butt against each other and which, by their own dimensions, define the distance between the outer boundaries of the installation support 10. The configuration with the divided installation support has the additional advantage that distortion of the body is absorbed by rotation of both parts of the installation support relative to each other in the contact surface of said parts. Noises which could otherwise be produced by distortion of the installation support are avoided as a result.

The invention claimed is:

1. A welded assemblage of a passenger car body, the welded assemblage comprising:
   at least one rear longitudinal member;
   a screw connection having cage nuts guided moveably in said longitudinal member transversely with respect to a longitudinal direction of said longitudinal member; and
   an installation support being a component being different from a bodyshell of the passenger car body and defining fitting positions of side wall panels and of a loading floor of the passenger car body relative to one another, said rear longitudinal member being screwed to said installation support by said screw connection, said installation support having luggage securing elements and holders for said luggage securing elements, said holders receiving and fixing the side wall panels, the loading floor and said luggage securing elements relative to one another.

2. The welded assemblage according to claim 1, wherein said component has a front region extending transversely between rear wheel houses of the passenger car body, and side regions extending parallel to a longitudinal axis of the passenger car body.

3. The welded assemblage according to claim 1, wherein said component is secured to the passenger car body in a predetermined position in a transverse direction of the passenger car body.

4. The welded assemblage according to claim 3, wherein said component is provided to be secured to the passenger car body by engagement in at least one receptacle of a lock cross-member covering of the passenger car body.

5. The welded assemblage according to claim 1, wherein said component is a single piece part.

6. The welded assemblage according to claim 1, wherein said component has at least one separate left part and one separate right part which, in an installed state, butt against each other and, by means of their own dimensions, define a distance between outer boundaries of said installation support.

7. The welded assemblage according to claim 1, wherein said component has first grooves formed therein running in a longitudinal direction in said component, said holders for said luggage securing elements are defined by said first grooves.

8. The welded assemblage according to claim 7, wherein said component has second grooves formed therein running in the longitudinal direction in said component, said holders for the side wall panels are defined by said second grooves.

9. The welded assemblage according to claim 8, wherein said second grooves run within said first grooves and are lower than said first grooves.

10. The welded assemblage according to claim 1, further comprising screws for connecting said component to the bodyshell and for fastening said luggage securing elements to said component.

11. The welded assemblage according to claim 1, wherein said component is composed of plastic.

12. A welded assemblage of a passenger car body for securing an installation support, the installation support containing a component being different from a bodyshell of the passenger car body and defining fitting positions of sidewall panels of the passenger car body and of a loading floor relative to one another, the installation support further having luggage securing elements, the component of the installation support having holders for the luggage securing elements, the holders receiving and fixing the sidewall panels, the loading floor and the luggage securing elements relative to one another, the welded assemblage comprising:
    at least one rear longitudinal member; and
    a screw connection having cage nuts guided moveably in said longitudinal member transversely with respect to a longitudinal direction of said longitudinal member for securing the installation support to said rear longitudinal member.

* * * * *